(12) United States Patent
Daftardar

(10) Patent No.: US 8,380,911 B2
(45) Date of Patent: Feb. 19, 2013

(54) PERIPHERAL DEVICE, PROGRAM AND METHODS FOR RESPONDING TO A WARM REBOOT CONDITION

(75) Inventor: Jayant Mohan Daftardar, Lawrenceville, GA (US)

(73) Assignee: LSI Corporation, Milpitas, CA (US)

( * ) Notice: Subject to any disclaimer, the term of this patent is extended or adjusted under 35 U.S.C. 154(b) by 339 days.

(21) Appl. No.: 12/880,942

(22) Filed: Sep. 13, 2010

(65) Prior Publication Data
US 2012/0066429 A1    Mar. 15, 2012

(51) Int. Cl.
G06F 13/14    (2006.01)
G06F 3/00    (2006.01)
G06F 15/177    (2006.01)
G06F 9/00    (2006.01)
G06F 1/24    (2006.01)

(52) U.S. Cl. .................. 710/305; 710/8; 710/10; 713/1; 713/100

(58) Field of Classification Search .................. 710/300, 710/305–306, 314, 200; 713/1, 100
See application file for complete search history.

(56) References Cited

U.S. PATENT DOCUMENTS

| | | | |
|---|---|---|---|
| 6,292,021 B1 | 9/2001 | Furtek et al. | |
| 7,146,515 B2 | 12/2006 | Harrington et al. | |
| 7,191,255 B2 | 3/2007 | Wong et al. | |
| 7,484,084 B1 | 1/2009 | Ranaweera et al. | |
| 7,557,607 B1 | 7/2009 | Tran et al. | |
| 2008/0162878 A1 | 7/2008 | Zimmer et al. | |
| 2008/0235429 A1* | 9/2008 | Gundam et al. | 710/313 |
| 2009/0265724 A1 | 10/2009 | Jibbe et al. | |

OTHER PUBLICATIONS

Budruk, Ravi et al. "PCI Express System Architecture". Mindshare, Inc. 2003. pp. 487-492. ISBN: 0-321-15630-7.*
Szydlowski, Craig, PCI Express Proves Dependable Bus for Facilitating Failover, FindArticles.com, Oct. 2005.
Wong, William, PCI Express Design: A Lesson in Techno-Shock, ElectronicDesign.com, Apr. 2005.

* cited by examiner

Primary Examiner — Thomas J Cleary

(57) ABSTRACT

A computing system peripheral device compatible with the peripheral component interconnect express (PCI-E) protocol responds to a DL_DOWN command primitive by configuring a general-purpose input/output (GPIO) port into a known state without invoking a GPIO module reset. In addition, select resources are excluded from resources on the peripheral device that are issued a reset command. The select resources can include a GPIO module, a memory element and a PCI-E SERDES module. After the remaining reset resources have completed their individual initialization processes, the central processor core on the peripheral device is reset. The described response to the DL_DOWN command primitive avoids cache data loss, masks signal transitions on I/O ports and timing problems that prevent some peripheral devices from being recognized in a computer's basic input/output system (BIOS).

20 Claims, 3 Drawing Sheets

PERIPHERAL DEVICE, PROGRAM AND METHODS FOR RESPONDING TO A WARM REBOOT CONDITION

TECHNICAL FIELD

The present application relates generally to computer systems and more specifically to the processing or response to a warm reboot condition in a system managed under the peripheral component interconnect express (PCI-E) protocol.

BACKGROUND

The input/output (I/O) devices of a computer system often communicate with a central processing unit (CPU) and system memory (e.g., random-access memory (RAM)) by way of a chipset. The chipset can include a memory controller and an I/O controller. Various peripheral devices are connected to the CPU by way of various buses, such as the peripheral component interconnect express bus (hereinafter PCI-E or PCI-E bus). The PCI-E bus uses high-speed serial signaling and enables point-to-point communication between devices. Communications along a PCI-E connection are made by way of packets and a message signal interrupt scheme.

The PCI-E specification calls for a reset mechanism that is in-band in nature. Unlike a traditional reset mechanism that involves a dedicated signal line, the in-band reset mechanism involves a command primitive "DL_DOWN" that is used in lieu of a reset signal on the dedicated signal line to initiate a reset sequence. The DL_DOWN status indicates that there is no connection with another component on the bus, or the connection with the other component has been lost and is not recoverable by the Physical or Data Link Layer.

At least two problems have been identified in prior art data storage systems that use the PCI-E protocol. The first identified problem is very specific in nature and results in a cache data loss. The data loss occurs due to a particular implementation of a battery-backup module with systems that include MegaRAID® I/O controllers. The MegaRAID® family of RAID controllers are deployed in a wide variety of RAID data-storage solutions. MegaRAID® is the registered trademark of LSI Corporation, a Delaware corporation having a place of business at 1110 American Parkway Nebr., Allentown, Pa., U.S.A. 18109-9138 and the assignee of the present application.

"RAID" is an umbrella term for computer data-storage schemes that can divide and replicate data among multiple hard-disk drives. On certain computing platforms, a warm reboot or a power-on reset (such as that commonly invoked on some computing systems by simultaneously entering CTRL+ALT+DEL from an attached keyboard) generates a DL_DOWN interrupt instead of a PCI-E reset signal. MegaRAID® battery backup modules connected to the MegaRAID® I/O controllers use a "reset" or "power good" signal to mask the transition of a battery-backup enable signal during a reset routine. However, during a DL_DOWN condition the battery backup enable signal is not masked, which causes cache data loss.

A second problem results from the invocation of a "system" reset during a DL_DOWN condition. The "system" reset involves the reset of a PCI-E serializer/deserializer (SERDES) module. If the DL_DOWN condition is quickly followed by a DL_UP condition and if the PCI-E SERDES module has not completed its reset routine, then subsequent configuration information is not passed to the PCI-E core. In such cases, the MegaRAID® I/O controller is not recognized by the basic input/output system (BIOS) of the computer and as a result data in the data-storage system managed by the MegaRAID® I/O controller is rendered inaccessible.

SUMMARY

An embodiment of a computing system peripheral device compatible with the peripheral component interconnect express (PCI-E) protocol includes a PCI-E core, a central processor core and a non-volatile memory element coupled to each other over a local bus. The PCI-E core is instantiated as an application specific integrated circuit. Input/output resources on the peripheral device include a general-purpose I/O (GPIO) module, a memory element, and a PCI-E serializer/deserializer (SERDES) module. The I/O resources are also coupled to the PCI-E core and the central processor core over the local bus. The non-volatile memory element has stored therein a set of executable instructions that are responsive to a DL_DOWN interrupt primitive identified on the peripheral device. When executed by the PCI-E core, the set of executable instructions direct a general-purpose I/O (GPIO) port into a known state and selectively direct resources coupled to the local bus to reset before invoking a reset of the central processor core.

An embodiment of a method for responding to a warm reboot condition in a peripheral device that responds to soft resets with a PCI-E DL_DOWN command primitive includes the steps of identifying a DL_DOWN command primitive in a PCI-E compatible device having a plurality of cores, directing an input/output (I/O) port into a known state, selectively directing a subset of the plurality of cores of the PCI-E compatible device to reset, waiting for an indication of synchronization from the subset of the plurality of cores, directing the subset of the plurality of cores into a non-reset condition, waiting for an indication of synchronization from the subset of the plurality of cores and invoking a central processor core reset.

An embodiment of a computer program product stored on a computer-readable medium includes logic configured to identify a DL_DOWN command primitive in a PCI-E compatible core, logic configured to direct an input/output (I/O) port into a known state in response to the logic configured to identify the DL_DOWN command primitive, logic configured to selectively direct a subset of the available resources of a PCI-E compatible device to reset, logic configured to wait for an indication of synchronization from the subset of the available resources and logic configured to invoke a central processor core reset responsive to the indication of synchronization.

The figures and detailed description that follow are not exhaustive. The disclosed embodiments are illustrated and described to enable one of ordinary skill to make and use the improved peripheral device, program and methods for responding to warm reboot conditions. Other embodiments, features and advantages of the peripheral device, program and methods will be or will become apparent to those skilled in the art upon examination of the following figures and detailed description. All such additional embodiments, features and advantages are within the scope of the peripheral device, program and methods as defined in the accompanying claims.

BRIEF DESCRIPTION OF THE FIGURES

The peripheral device, program and methods for responding to warm reboot conditions can be better understood with reference to the following figures. The elements and features within the figures are not necessarily to scale, emphasis instead being placed upon clearly illustrating the principles for selectively invoking independent reset mechanisms to manage a DL_DOWN condition. Moreover, in the figures, like reference numerals designate corresponding parts throughout the different views.

DETAILED DESCRIPTION

In response to the above-identified problems, a peripheral component interconnect express (PCI-E) compatible device includes a set of executable instructions that when executed by the PCI-E core or other processing cores on the PCI-E device performs a modified DL_DOWN response routine. Preferably, the executable instructions are stored in a read-only memory (ROM) element that is accessed each time the PCI-E core identifies a DL_DOWN condition via the PCI-E interface. Alternatively, the executable instructions can be transferred from the ROM element to a volatile memory element such as a cache memory or RAM before being communicated to a processor for execution on the PCI-E compatible device. The conventional DL_DOWN routine is modified such that instead of issuing a system level reset command, which indiscriminately resets all resources on the peripheral device, separate reset commands are issued to a select subset of the resources on the device. Once the peripheral device resources that received the separate reset commands have indicated that their respective and separate reset routines are complete, the peripheral device directs the reset resources to a known state. Thereafter, the peripheral device forwards a reset command to the local central processor unit.

In an example embodiment, a cache memory element is excluded from the subset of resources that are issued separate reset commands. This preserves the data state in the cache memory element when the DL_DOWN condition is encountered.

In another example embodiment, a general purpose I/O (GPIO) module and a PCI-E SERDES module are not issued a reset command. In this embodiment, the GPIO registers are commanded to a known state except for the port that corresponds to a battery backup enable signal. This can avoid the boot sequence timing issue that prevents a MegaRAID® I/O controller from being recognized by a computer system BIOS when the PCI-E SERDES module fails to complete its reset routine before the host computing system's BIOS is expecting information from the controller.

Figure 1:
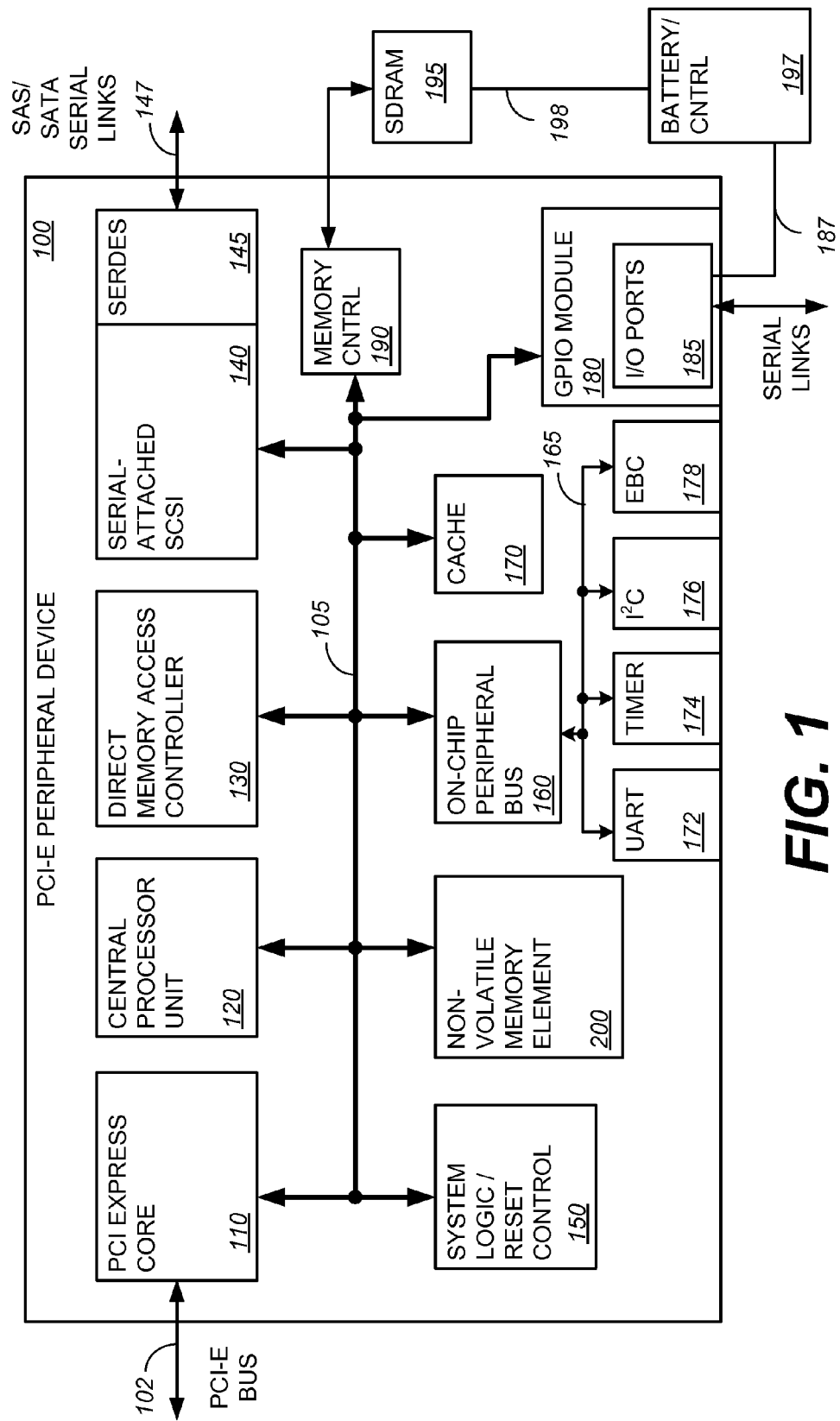
FIG. 1 is a functional block diagram illustrating an example embodiment of a PCI-E compliant peripheral device.

Reference is now directed to the example embodiments illustrated in the various drawings in which FIG. 1 is a functional block diagram illustrating an embodiment of a PCI-E peripheral device 100. In the example embodiment, the PCI-E peripheral device 100 is a RAID controller that communicates with a host computing device such as a server computer, a desktop computer, etc. over a PCI-E bus 102. The PCI-E peripheral device 100 further communicates with a desired number of Serial-Attached Small Computer System Interface (SAS) or Serial-Advanced Technology Attachment (SATA) data storage devices (not shown) via SAS/SATA serial links 147. In some embodiments, the SAS/SATA serial links 147 communicate with the physical hard-disk drives via one or more extenders (not shown).

As further illustrated in FIG. 1, the PCI-E peripheral device 100 may communicate via the memory controller 190 and a memory bus with one or more synchronous-dynamic random-access memory elements such as SDRAM 195. The SDRAM 195 is a volatile memory element. That is, information stored within the SDRAM 195 is lost when power is interrupted or removed from the SDRAM 195.

As further illustrated in FIG. 1, a battery control element 197 is coupled to the SDRAM 195 and provides a supply voltage on connection 198 that is sufficient for the SDRAM 195 to retain the data stored therein when power is interrupted to the SDRAM 195. The battery control element provided supply voltage is selectively applied in accordance with an enable/disable signal communicated to the battery control element 197 on connection 187 by way of a designated I/O port 185. Although the SDRAM 195 is located off the PCI-E peripheral device 100 in the illustrated embodiment, it should be understood that in an alternative embodiment one or more RAM elements such as a SDRAM may be integrated within the PCI-E peripheral device 100.

As also illustrated in FIG. 1, the PCI-E peripheral device 100 is configured to communicate to a desired number of external devices via I/O ports 185 under the control of a general purpose I/O (GPIO) module 180. The external devices include the battery control element 197 and one or more devices, which can be coupled to the PCI-E peripheral device 100 by way of one or more serial data links. For example, an I/O port 185 can be coupled to a 1-Wire® device (not shown) commonly known as an iButton® device.

iButton® devices are self-timed semiconductor devices. The timing logic provides a means of measuring and generating digital pulses of various widths. Data transfers are bit-sequential and half-duplex. Data can be interpreted as commands (according to a prearranged format) that are compared to information already stored in the iButton® device to make a decision, or can simply be stored in the iButton® device for later retrieval. iButton® devices are considered slaves, while the host reader/writer (e.g., the GPIO module 180 or the PCI-E peripheral device 100) is considered a master.

The PCI-E peripheral device 100 includes a PCI-E core 110, a central processor core 120, a direct memory access controller 130, a SAS controller 140, a serializer-deserializer (SERDES) device 145, a system logic element 150, an on-chip peripheral bus controller 160, a cache memory element 170, a general-purpose I/O device 180 and a memory controller 190 coupled to one another on a local communication bus 105. The on-chip peripheral bus controller 160 is further coupled to a Universal Asynchronous Receiver/Transmitter (UART) 172, timer element 174, an intelligent interface controller ($i^2C$) 176, and an extended industry standard architecture bus controller (EBC) 178. The on-chip peripheral bus controller 160 buffers and translates signals between the local bus 105 and the on-chip peripheral device bus 165. Each of the UART 172, timer element 174, $i^2C$ 176 and EBC 178 enable communications with additional external devices.

The PCI-E core 110 is a processing resource that is dedicated to identifying PCI-E compliant signals communicated by a host computing device (not shown) over the PCI-E bus 102 and communicating the same with the internal central processor unit 120 or other devices coupled to the PCI-E core 110 via the local bus 105. The PCI-E core 110 is also configured to receive information from the central processing core 120 and other devices coupled to the PCI-E core 110 via the local bus 105, format the same in accordance with the PCI-E protocol and communicate the same to the host computing device (not shown) over the PCI-E bus 102.

The central processing core 120 is a processing resource (i.e., hardware) for executing software, particularly software stored in the system logic/reset control 150, which can be supported by a ROM element; non-volatile memory element 200, which can be supported by a programmable read-only memory (PROM) an erasable programmable read-only memory (e.g., EPROM, EEPROM, or Flash memory), and in the cache memory element 170, which is another volatile memory element). The central processor core 120 can be constructed in accordance with any custom made or commercially available integrated processor, or can even be a standalone central processing unit (CPU), an auxiliary processor among several processors associated with PCI-E peripheral device 100, a semiconductor based microprocessor (in the form of a microchip or chip set), or generally any device for executing software instructions stored in the system logic/reset control element 150, the non-volatile memory element 200 or the cache memory element 170.

The direct memory access controller 130 enables the serial attached SCSI controller 140 to access system memory for reading and/or writing independently of the central processor core 120. The direct memory access controller 130 also enables data transfers between the memory controller 190, the PCI-E core 110, the GPIO module 180 and the cache memory element 170.

The serial-attached SCSI controller 140 works in conjunction with the Serializer/Deserializer (SERDES) 145 to transmit and receive data over the SAS/SATA serial links 147. The SERDES 145 can be either a stand-alone device or, as shown in the example embodiment is in the form of a dedicated processing core integrated with a serial bus controller such as the serial-attached SCSI 140 or an application-specific integrated circuit (ASIC). In essence, the SERDES 145 is a serial transceiver, which converts parallel data into a serial data stream on the transmitter side and converts the serial data back to parallel on the receiver side. The timing skew problem encountered in a parallel bus is avoided by embedding a clock signal into the data stream that is communicated to SERDES coupled devices.

Figure 2:
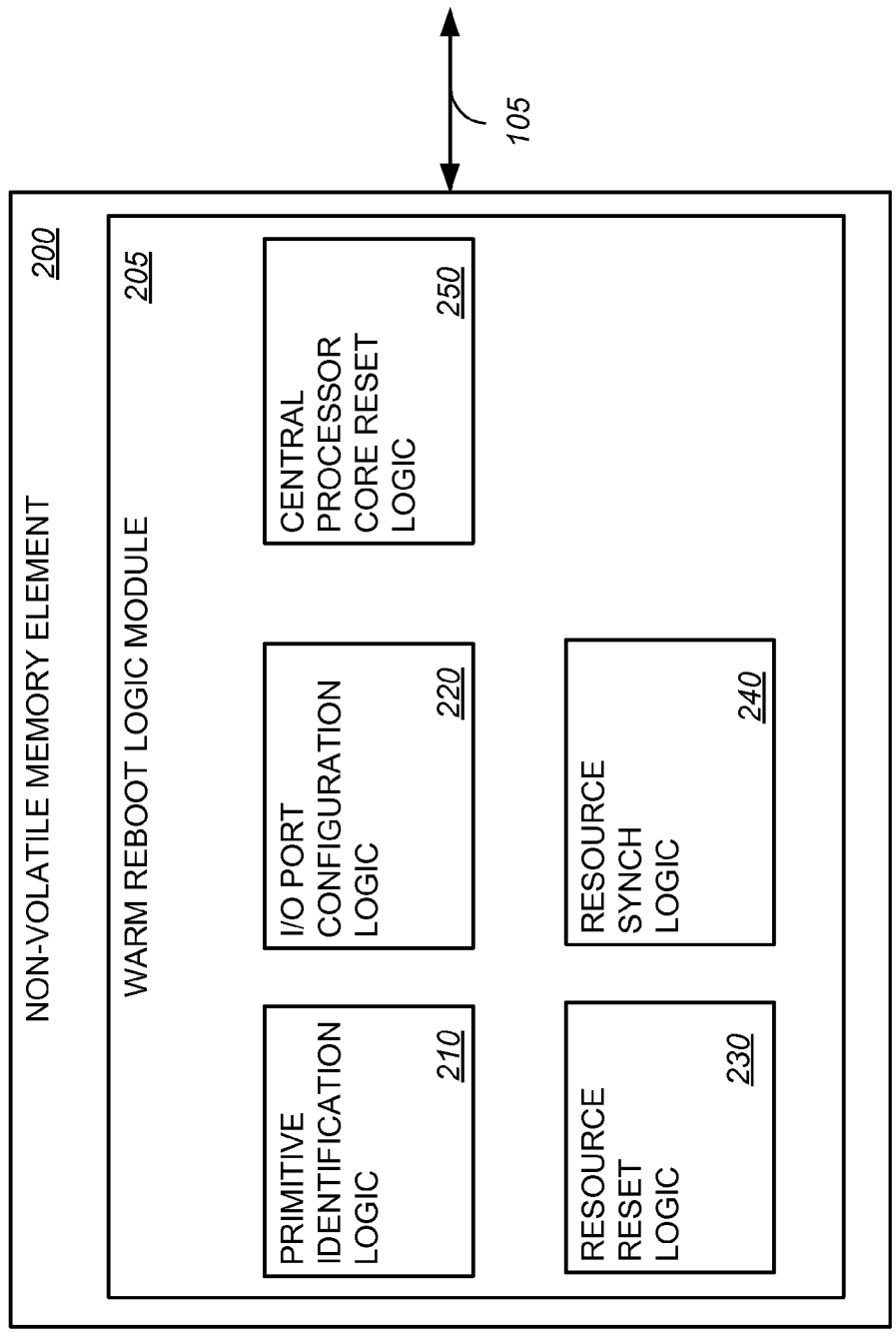
FIG. 2 is a block diagram illustrating an example embodiment of a non-volatile memory element of the peripheral device of FIG. 1.

As described in greater detail below, one or both of the system reset logic control 150 and the non-volatile memory element 200 is configured with logical instructions that (when executed) instruct the PCI-E peripheral device 100 to perform a select warm reboot routine in response to a DL_DOWN signal on the PCI-E bus 102. The non-volatile memory element 200 is not so limited and may include additional data and logical instructions for purposes other than performing a select or modified warm reboot routine. The select warm reboot routine resets and configures a first subset of resources on the PCI-E peripheral device 100. A second subset of resources on the PCI-E peripheral device 100 are not reset or reconfigured during the select warm reboot routine. The logical instructions defining the warm reboot routine may be arranged across separate and distinct modules separated by their respective function or functions, as illustrated in FIG. 2, or in a single module or program. Moreover, because the non-volatile memory element 200 can be implemented by a rewritable memory element such as an EPROM or EEPROM, the warm reboot routine can be updated or modified as may be desired.

However arranged and wherever stored on the various memory elements available on the PCI-E peripheral device 100, the logical instructions direct the PCI-E peripheral device 100 to configure an I/O port 185 into a default state without invoking or performing a GPIO module reset procedure. During a full or conventional PCI-E peripheral device reset routine, the PCI-E peripheral device supply voltage to the SDRAM 195 is temporarily interrupted when the GPIO module 180 is reset despite the external battery. This occurs as a result of a signal transition on the enable/disable signal communicated on connection 187. By avoiding a GPIO module reset and maintaining a desired signal condition on connection 187, the modified warm reboot routine ensures that data stored in the SDRAM 195 is not lost.

In addition to commanding a specific I/O port to a desired state, the logical instructions also forward a module specific reset command to a select subset of the available resources on the PCI-E peripheral device 100, wait for an indication of synchronization, forward a command to configure each reset resource into a known state, wait for an indication that the separate configuration commands are complete, and invoke a central processor core reset. The select subset of resources on the PCI-E peripheral device that are reset exclude the GPIO module 180, the cache memory element 170, the non-volatile memory element 200, and the SERDES 145. Stated another way, the SERDES 145, the cache memory element 170, the GPIO module 180, and the non-volatile memory element 200 are not reset in response to the DL_DOWN primitive. The SERDES 145, the cache memory element 170, the GPIO module 180, and the non-volatile memory element 200 are members of a second subset of the resources on the PCI-E device 100. The resources or members of this second subset are not reset in response to a DL_DOWN primitive. Whereas, the PCI-E core 110, the direct memory access controller 130, the on-chip peripheral bus controller 160 and one or more of the UART 172, the timer element 174, the $i^2C$ 176 and the EBC 178 are directed to perform respective reset procedures. The PCI-E core 110, the direct memory access controller 130, and the on-chip peripheral bus controller 160 are members of the first subset of the resources on the PCI-E device 100. The resources or members of this first subset are reset in response to a DL_DOWN primitive.

FIG. 2 is a block diagram illustrating an example embodiment of the non-volatile memory element 200 of the PCI-E peripheral device 100 of FIG. 1. The non-volatile memory element 200 maintains the data stored therein even when power is not available to the PCI-E peripheral device 100. As illustrated in FIG. 2, the non-volatile memory element 200 includes a warm reboot logic module 205. The warm reboot logic module 205, which may be stored in a sub-portion of the total memory capacity of the non-volatile memory element 200, includes various logic elements that when executed by one or more processors or processing cores within the PCI-E peripheral device 100, perform specified functions during a warm reboot to avoid the above-described cache memory loss and timing problems. These specified functions include identifying a warm reboot condition on the PCI-E peripheral device 100 as indicated by a select in-band signal on the bus 105, instructing an I/O port into a known state, selectively instructing only a subset of the resources on the PCI-E peripheral device 100 to reset, waiting for an indication that the subset of the resources have completed their respective reset procedures, directing the subset of resources to a desired non-reset condition, waiting for a desired response from each of the subset of resources and thereafter invoking a central processor unit reset on the PCI-E peripheral device 100.

In the illustrated embodiment, the logic module 205 includes a primitive identification logic element 210, an I/O port configuration logic element 220, a resource reset logic element 230, a resource synchronization logic element 240 and a central processor unit reset logic element 250. The logic module 205 is not so limited and can be arranged in a host of alternative configurations that include the combination of all logical functions together in a single logic element, as well as the combination of some logical functions in two or more logic elements. Moreover, the logical functions stored in the various logic elements within the logic module 205 can be distributed across one or more additional non-volatile memory elements in communication with one or more processors in communication with the non-volatile memory elements.

However configured and wherever stored, the primitive identification logic 210 identifies when an in-band primitive signal is indicated on the bus 105. More specifically, the primitive identification logic 210 when executed by a processor on the PCI-E peripheral device 100 identifies when a "DL_DOWN" signal in accordance with the PCI-E specification is present on the bus 105. The presence of the "DL_DOWN" signal triggers the executable logic within the logic module 205 to invoke or execute the I/O port configuration logic 220. When executed, the I/O port configuration logic 220 directs an I/O port 185 into a known state. In an example embodiment, the I/O port configuration logic 220 directs an I/O port 185 into a default state without invoking or executing a GPIO module reset command. The known or default state can include selecting the I/O port 185 into an open drain mode or a tri-state mode. The I/O port 185 can be coupled to a battery backup device and configured to mask a transition in a battery backup enable signal during the warm reboot routine.

Thereafter, the executable logic within the logic module 205 invokes or executes the resource reset logic 230. When executed, the resource reset logic 230 directs a subset of the processing resources or cores on the PCI-E peripheral device 100 to perform a reset procedure. That is, the entire PCI-E peripheral device 100 is not reset. In an example embodiment, the resource reset logic 230 specifically excludes and does not direct a reset of the general purpose I/O module 180, the SERDES module 145, and the cache memory element 170. By not resetting the general purpose I/O module 180, the logic in the non-volatile memory element 200 ensures that the general purpose I/O module 180 does not configure one or more of the I/O ports 185 to an undesired state. By not resetting the SERDES module 145, the logic in the non-volatile memory element 200 ensures that the PCI-E peripheral device 100 is ready to respond to a BIOS generated information request from the central processor of a host computing device. Otherwise, if the SERDES module 145 were to be reset, there is no mechanism for ensuring that the PCI-E peripheral device 100 would be ready to respond when the BIOS of a host computing device communicated with the device. In addition, by not resetting the cache memory element 170, the logic in the non-volatile memory element 200 ensures that the present state of the cache memory 170 is maintained during the warm reboot.

After the PCI-E peripheral device 100 has executed the resource reset logic 230, the resource synchronization logic 240 is invoked or executed. When executed, the resource synchronization logic 240 is configured to wait for an indication that each resource that has been directed to perform a reset procedure has in fact completed the reset procedure. Once each resource has communicated that its respective reset procedure has successfully completed, the resource synchronization 240 is further configured to direct one or more the reset resources to a non-reset state. In a hardware based embodiment, a processor command issues or invokes a reset of members of the first subset of resources on the PCI-E peripheral device 100. A subsequent command is not executed until each of the reset members of the first subset of resources on the PCI-E peripheral device have confirmed completion of their respective reset procedure by a return signal or signals. In addition, the resource synchronization logic 240 can be configured to confirm the non-reset state of one or more of the resources on the PCI-E peripheral device 100 before invoking the central processor core reset logic 250. Once the resource synchronization logic 240 has verified the completion of the configuration of the one or more non-reset states or in accordance with a desired time, the resource synchronization logic 240 invokes or directs the warm reboot logic module 205 to invoke or execute the central processor core reset logic 250. When executed, the central processor core reset logic 250 directs the central processor core 120 to perform a reset procedure.

Figure 3:
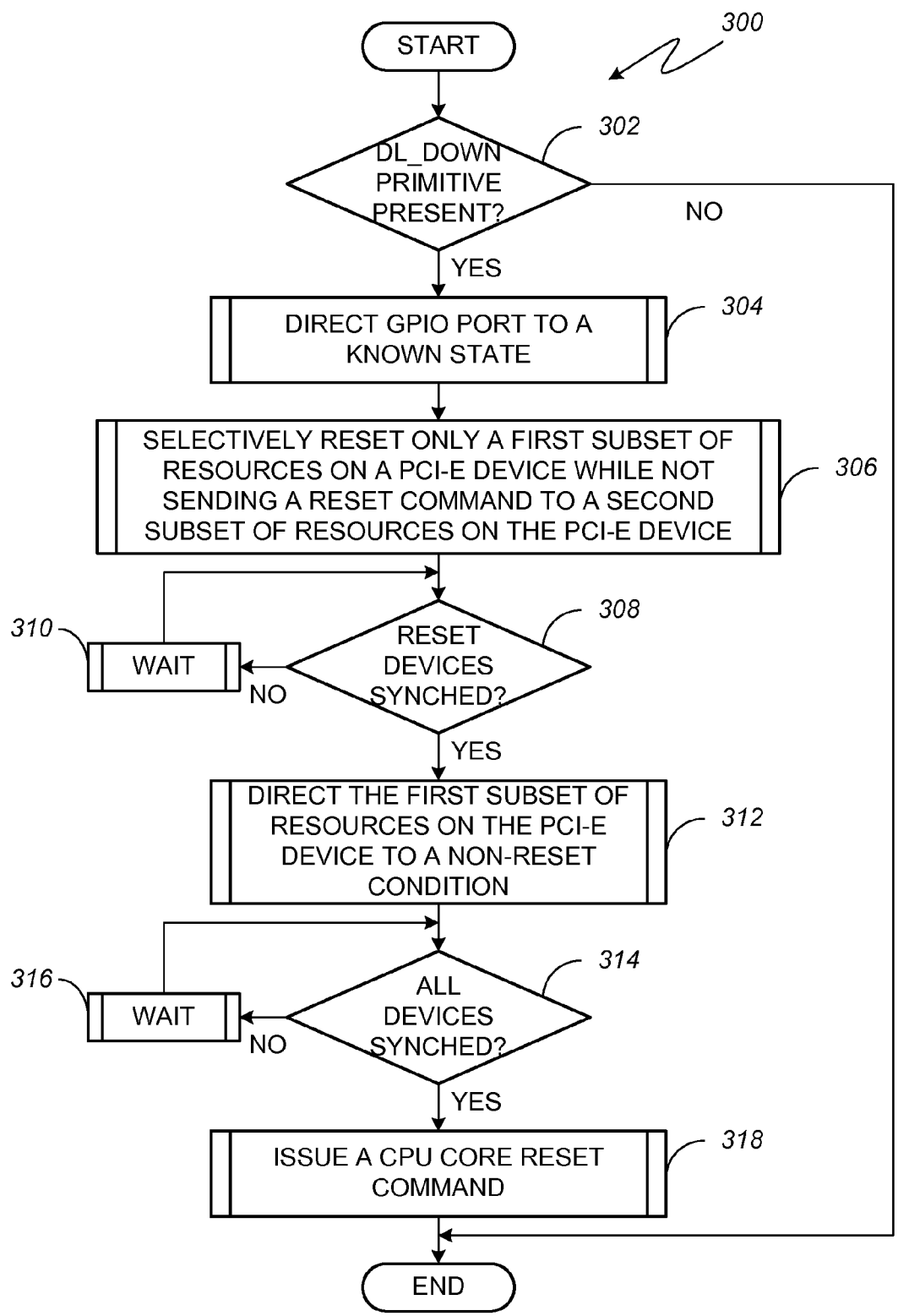
FIG. 3 is a flow diagram illustrating an embodiment of a method for responding to a DL_DOWN condition that can be implemented by the PCI-E compliant peripheral device of FIG. 1.

FIG. 3 is a flow diagram illustrating an embodiment of a method 300 for responding to a DL_DOWN condition that can be implemented by the PCI-E compliant peripheral device 100 of FIG. 1. In this regard, each block represents a module, segment, or portion of code, which comprises one or more executable instructions for implementing the specified function(s). When the PCI-E compliant peripheral device 100 is implemented via hardware, hardware and firmware, or a combination of hardware and software, one or more blocks in the flow diagram may represent an additional circuit or circuits. The described functions can be embodied in source code including human-readable statements written in a programming language or machine code that comprises instructions recognizable by a suitable execution system and or implemented via processor commands designated to perform the illustrated functions.

The method 300 begins with a decision block 302 where a determination is made concerning the presence of a DL_DOWN primitive on the local bus 105. When the DL_DOWN primitive is not present on the local bus 105, as indicated by the flow control arrow labeled "NO" exiting decision block 302, when a DL_DOWN primitive is not detected, the method 300 may bypass the warm reboot routine and simply end or terminate. The method 300 can be invoked or restarted at a subsequent time. Otherwise, when the DL_DOWN primitive is present, as indicated by the flow control arrow labeled "YES" exiting the decision block 302, the method 300 continues with block 304 where a general purpose I/O port is configured to a known state. As indicated above, the I/O port may be configured to mask a transition in a signal during the warm reboot.

In block 306, only a first subset of the available resources on the PCI-E peripheral device 100 are selectively commanded to perform respective reset procedures. As further indicated in block 306, a second subset of resources on the PCI-E peripheral device 100 are not so configured. As indicated above, the second subset of resources may include the cache memory element 170, the GPIO module 180, the SERDES 145 and perhaps additional resources as may be desired.

In decision block 308, it is determined whether the reset resources or devices on the PCI-E peripheral device 100 are synchronized. The resources that were commanded to perform a reset are synchronized when each has completed its respective reset procedure. If it is determined that the resources have not completed their respective reset procedures, the method 300 waits for a desired amount of time, as indicated in block 312 before repeating the query in decision block 310. In a hardware embodiment, the functions illustrated in blocks 308 and 310 can be performed by a processor command that both issues or directs the desired resources to perform a reset and waits for an indication of completion of the respective reset procedures before permitting a subsequent command to be loaded and executed by the processor.

Otherwise, when the resources have each completed their respective reset procedures, as indicated by the flow control arrow labeled "YES" exiting decision block 310, the method 300 directs the first subset of resources on the PCI-E peripheral device 100 to a non-reset condition, as indicated in block 312. In decision block 314, a determination is made as to whether all devices or resources that were directed to a non-reset condition in block 312 are synchronized. The resources that were commanded to a non-reset condition are synchronized when each has completed its respective configuration command. If it is determined that the resources have not completed their respective configuration task, the method 300 waits for a desired amount of time, as indicated in block 316 before repeating the query in decision block 314. Otherwise, when the resources have each completed their respective configuration task, as indicated by the flow control arrow labeled "YES" exiting decision block 314, the method 300 issues a central processor core reset command, as indicated in block 318. Note that the central processor core is a computing resource on the PCI-E peripheral device 100 and is not related in any way to a reset of the central processor of a host computing device.

Exemplary steps for responding to a warm reboot condition in a PCI-E compliant device such as a RAID controller are illustrated in FIG. 3. The particular sequence of the steps or functions in blocks 302 through 318 is presented for illustration. It should be understood that the order of the steps or functions in blocks 302 through 318 can be performed in other suitable orders to prevent cache data loss, to avoid reconfiguration or resetting I/O port pins during a system reset, and/or to maintain one or more 1-wire devices that require a signal to remain in a known state that cannot be guaranteed during a conventional device or system reset. For example, the functions indicated in association with block 304 and block 306, respectively can be performed substantially together or in the reverse order from that shown in the flow diagram of FIG. 3.

It should be understood that functional portions of the PCI-E peripheral device 100 may be enabled by a source program, an executable program (object code), script, or any other entity comprising a set of instructions to be performed. When in the form of a source program, the program needs to be translated via a compiler, assembler, interpreter, or the like, which may or may not be included within the various memory devices available on the PCI-E peripheral device 100, so as to operate properly in connection with the above-described host computing device and hard disk drives (not shown). Furthermore, portions of a source program may be written in (a) an object oriented programming language, which has classes of data and methods, or (b) a procedure programming language, which has routines, subroutines, and/or functions.

When the logic used by the PCI-E peripheral device 100 is implemented in software, as is shown in the functional block diagram of FIG. 2, one or more of the primitive identification logic 210, the I/O port configuration logic 220, the resource reset logic 230, the resource synchronization logic 240 and the central processor core reset logic 250 may be stored on any computer-readable medium for use by or in connection with any computer-related system or method. In the context of this document, a computer-readable medium is an electronic, magnetic, optical, or other physical device or mechanism that can contain or store a computer program and data for use by or in connection with a processor-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where the PCI-E peripheral device 100 is implemented in hardware, it may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), etc.

Data in digital systems, such as data storage systems is generally stored in non-volatile memory devices. Volatile storage refers to data that is only valid while power is maintained, while as previously described, non-volatile memory will maintain data even without power. When the warm reboot logic is well-defined and is not intended to be changed, the warm reboot logic can be stored in a read-only memory such as that used to support the system logic/reset control 150 (FIG. 1). Otherwise, the warm reboot logic can be stored in a programmable or updateable memory device such as an EPROM, EEPROM, and/or a Flash memory such as those that may support the non-volatile memory element (FIG. 1) and that can be altered or changed as may be desired after manufacture and deployment of the PCI-E peripheral device 100.

While various embodiments of the peripheral device, program and methods for responding to a DL_DOWN interrupt primitive on a PCI-E compatible peripheral device 100 have been described, it will be apparent to those of ordinary skill in the art that many more embodiments and implementations are possible that are within the scope of this disclosure. Accordingly, the described peripheral device, program and methods are not to be restricted or otherwise limited except in light of the attached claims and their equivalents.

What is claimed is:

1. A method for responding to a warm reboot condition in a peripheral device that responds to soft resets with a PCI-E DL_DOWN command primitive, the method comprising:
    identifying a DL_DOWN command primitive in a PCI-E compatible device having a plurality of cores;
    directing an input/output (I/O) port into a known state;
    selectively directing a subset of the plurality of cores of the PCI-E compatible device to reset;

waiting for an indication of synchronization from the subset of the plurality of cores;
directing the subset of the plurality of cores into a non-reset condition;
waiting for an indication of synchronization from the subset of the plurality of cores; and
invoking a central processor unit reset.

2. The method of claim 1, wherein the step of identifying a DL_DOWN command primitive in a PCI-E controller is performed in a redundant array of independent disks (RAID) controller.

3. The method of claim 1, wherein the step of directing an I/O port into a known state comprises directing a general purpose I/O port into a default state without invoking a general purpose I/O module reset.

4. The method of claim 1, wherein the step of selectively directing a subset of the plurality of cores of the PCI-E compatible devices to reset excludes a general purpose I/O module, a serializer/deserializer (SERDES) module, and a memory device.

5. The method of claim 1, further comprising:
selectively directing a subset of the input/output resources of the PCI-E compatible device to reset.

6. The method of claim 5, wherein the step of selectively directing a subset of the input/output resources of the PCI-E compatible device to reset excludes one or more of a hardware pin dedicated to a corresponding event trigger and an addressable 1-wire device.

7. The method of claim 1, wherein the step of identifying a DL_DOWN command primitive in a PCI-E compatible device having a plurality of cores comprises a PCI-E compatible device with one or more of a serial attached small computer system interface (SAS) core, a direct-memory access (DMA) core, a static random-access memory (SRAM) core, a SAS SERDES core and a PCI-E SERDES core.

8. A computing system peripheral device compatible with the peripheral component interconnect express protocol, comprising:
a peripheral component interconnect express (PCI-E) core instantiated as an application specific integrated circuit on the peripheral device;
a central processor core coupled to the PCI-E core by way of a local bus, the local bus further coupling a general purpose input/output (GPIO) module, a memory element, and a PCI-E serializer/deserializer (SERDES) module to the PCI-E core and the central processor core; and
a non-volatile memory element coupled to the local bus, the non-volatile memory element configured to store a set of executable instructions responsive to a DL_DOWN interrupt primitive that when executed on the peripheral device direct a GPIO port into a known state and selectively direct a subset of available resources coupled to the local bus to reset before invoking a reset of the central processor core.

9. The computing system peripheral device of claim 8, wherein the set of executable instructions in the non-volatile memory element direct the PCI-E core to wait for an indication that reset resources are synchronized before directing the reset resources to a non-reset state.

10. The computing system peripheral device of claim 9, wherein the set of executable instructions in the non-volatile memory element direct the PCI-E core to wait for an indication that resources directed to the non-reset state are synchronized before invoking the reset of the central processor unit.

11. The computing system peripheral device of claim 10, wherein the PCI-E core directs the GPIO port to a default state.

12. The computing system peripheral device of claim 8, wherein the set of executable instructions in the non-volatile memory element direct the PCI-E core to reset all resources with the exception of the GPIO module, the PCI-E SERDES module and the memory element.

13. The computing system peripheral device of claim 8, wherein the PCI-E core directs the selective reset of one or more I/O devices coupled to the local bus by way of an on-chip peripheral bus.

14. The computing system peripheral device of claim 13, wherein the one or more I/O devices selected from the group consisting of a universal asynchronous receiver-transmitter (UART), a timer, an intelligent interface controller ($I^2C$), and an extended industry standard bus controller.

15. A program including a set of executable instructions embodied on a computer readable storage medium, comprising:
logic configured to identify a DL_DOWN command primitive in a PCI-E compatible core;
logic configured to direct an input/output (I/O) port into a known state in response to the logic configured to identify the DL_DOWN command primitive;
logic configured to selectively direct a subset of the available resources of a PCI-E compatible device to reset;
logic configured to wait for an indication of synchronization from the subset of the available resources; and
logic configured to invoke a central processor unit reset responsive to the indication of synchronization.

16. The program of claim 15, wherein the logic configured to identify a DL_DOWN command primitive in a PCI-E controller is executed in a redundant array of independent disks (RAID) controller.

17. The program of claim 15, wherein the logic configured to direct an I/O port into a known state comprises logic configured to direct a general purpose I/O port into a default state without invoking a general purpose I/O module reset.

18. The program of claim 15, wherein the logic configured to selectively direct a subset of the available resources of the PCI-E compatible device to reset excludes sending a reset to a general purpose I/O module, a serializer/deserializer (SERDES) module, and a memory device.

19. The program of claim 15, further comprising:
logic configured to selectively direct a subset of the input/output resources of the PCI-E compatible device to reset.

20. The program of claim 19, wherein the logic configured to selectively direct a subset of the input/output resources of the PCI-E compatible device to reset excludes one or more of a hardware pin dedicated to a corresponding event trigger and an addressable 1-wire device.

* * * * *